United States Patent [19]
Berlin et al.

[11] 3,751,140
[45] Aug. 7, 1973

[54] OPTICAL DEVICE

[75] Inventors: Milton Berlin, Forest Hills; Lawrence M. Rheingold, Baldwin, both of N.Y.

[73] Assignee: Templet Industries Inc., Plainview, N.Y.

[22] Filed: Oct. 26, 1971

[21] Appl. No.: 192,403

[52] U.S. Cl. .................. 350/305, 350/293, 350/299, 248/481
[51] Int. Cl. ............................................. G02b 5/08
[58] Field of Search................... 350/288, 299, 293, 350/300, 305; 248/481

[56] References Cited
UNITED STATES PATENTS

| | | |
|---|---|---|
| 1,859,592 | 5/1932 | Marchand........................... 350/305 |
| 2,026,010 | 12/1935 | Ritz-Woller......................... 350/300 |
| 3,392,950 | 7/1968 | Pierce................................. 248/481 |
| 2,668,477 | 2/1954 | Shaikun.............................. 350/305 |
| 3,620,605 | 11/1971 | Clark.................................. 350/305 |

*Primary Examiner*—David Schonberg
*Assistant Examiner*—Michael J. Tokar
*Attorney*—William E. Anderson et al.

[57] ABSTRACT

A device which reflects magnified reflected images of the eyes of a viewer from each of a plurality of different angles of perspective.

7 Claims, 5 Drawing Figures

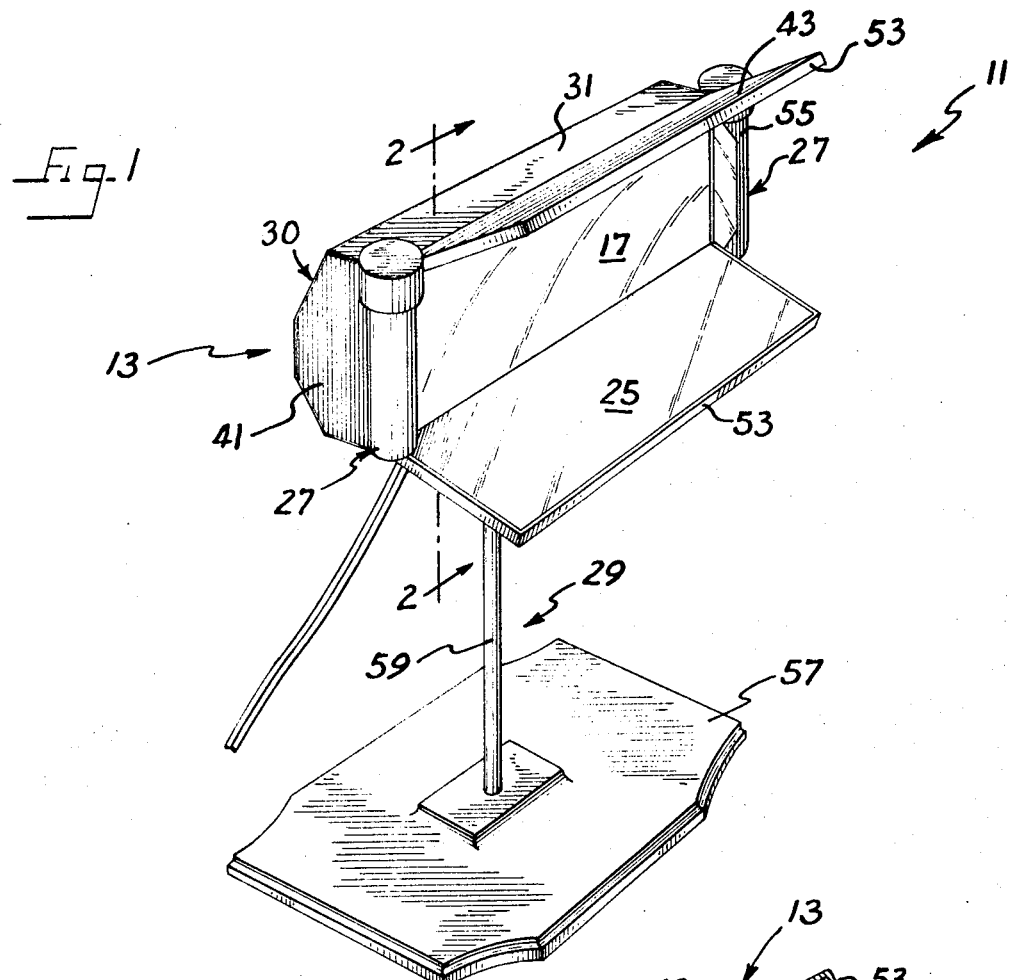

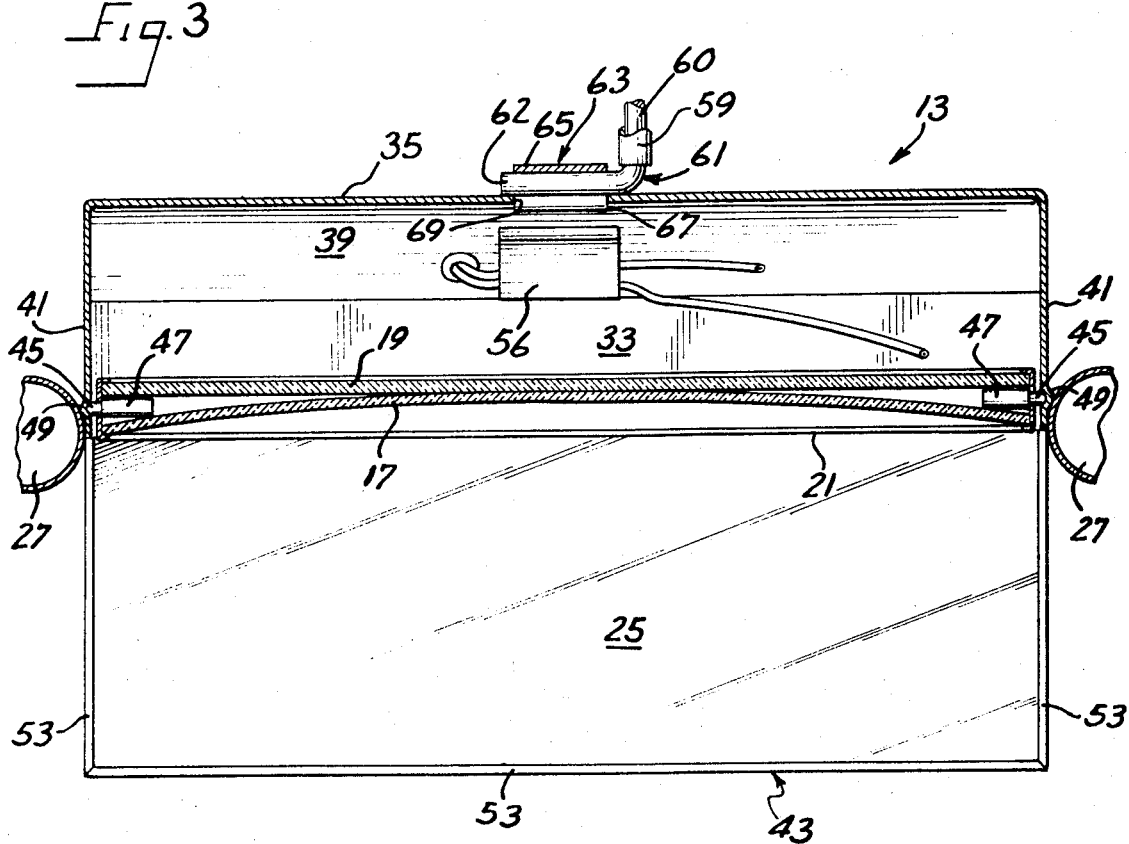
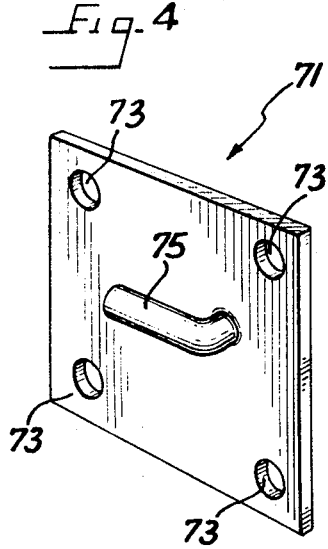
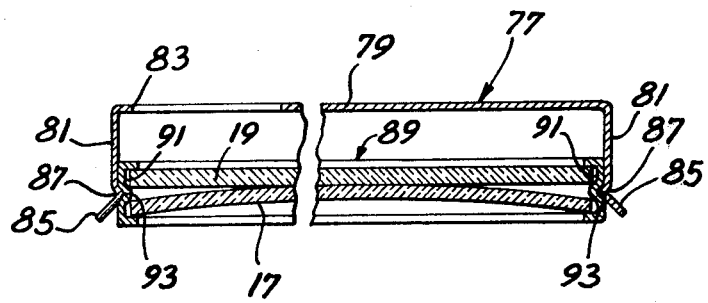

OPTICAL DEVICE

The present invention relates to devices for use as a looking glass for viewing the eyes. More particularly, the invention is directed to a device capable of presenting both magnified and non-magnified reflected images of the eyes of a viewer from each of a plurality of differing angles of perspective.

In certain instances, such as in the application of cosmetics about the eyes, in the placing of contact lenses in the eyes, in the fitting of eye glasses, etc., it is desirable to utilize a looking glass which can be supported in close proximity to the user and which will reflect images of the eyes and that portion of the head surrounding the eyes from different angles of perspective. While looking glasses have been provided in which two or more mirrors are disposed at various angles to one another, none have been completely satisfactory for close-up viewing of the eyes and adjoining portions of the face and head.

It is the primary object of the present invention to provide an improved device for reflecting images of the eyes of a viewer from different angles of perspective.

This and other objects of the invention will become apparent from the following description and the accompanying drawings, in which:

FIG. 1 is a perspective view of a device embodying various features of the present invention;

FIG. 2 is an enlarged cross-sectional elevational view taken along line 2—2 of FIG. 1;

FIG. 3 is a cross-sectional elevational view taken along line 3—3 of FIG. 2;

FIG. 4 is a perspective view of an element which might be used with a portion of the device shown in FIG. 1; and FIG. 5 is a plan view of one element of an alternate embodiment of the device of FIGS. 1 through 3.

While the present invention will be described in connection with certain preferred embodiments, it will be understood that the invention is not limited to these particular embodiments.

Very generally, there is illustrated in the drawings a device 11 having a frame 13. An image-magnifying mirror 17 and a non-magnifying mirror 19 are carried within a holder 21 mounted on the frame 13 in such a manner as to permit their positions to be interchanged, depending upon the desires of the user, thereby permitting both normal and magnified images to be obtained. Non-magnifying mirrors 23 and 25 are disposed in flanking relation to the holder 21 and, thus, to the mirrors 17 and 19 and are disposed at an obtuse angle relative to the operative plane of such mirrors. Accordingly, the device is capable of providing a viewer with three images of his eyes, and all three images will be magnified or not depending upon the positions of the mirrors 17 and 19 relative to the flanking mirrors 23 and 25. A light source 27 is mounted on the frame adjacent each end of the holder 21, and a pedestal 29 is provided for supporting the frame 13 in an elevated position.

The frame 13 includes an enclosure 30 open along one side (hereinafter referred to as its forward side) formed, as of sheet metal, to provide parallel top and bottom walls 31 and 33 and to provide a back wall defined by a central section 35 parallel to the forward side of the enclosure and inclined sections 37 and 39 which extend from the top and bottom edges respectively of the central section to the top and bottom walls 17 and 19 of the enclosure. In the illustrated embodiment, the device 11 is disposed with the central section 21 of the back wall vertically oriented and with the top and bottom walls 31 and 33 horizontally oriented, and in the foregoing description, that disposition of the device will be used as a reference. It is to be understood, however, that the device may assume various other dispositions. An end wall 41 is provided at each end of the enclosure 30, and supporting panels 43 for the flanking mirrors 23 and 25 diverge from the forward edges of the top and bottom walls 31 and 33 respectively.

In the illustrated embodiment, the magnifying mirror 17 and the non-magnifying mirror 19 are conventional mirrors formed of glass which is appropriately coated on its reverse side. However, these mirrors could also be formed of a suitable polished metal, a metal-coated plastic, or other such material, if desired. The magnifying mirror 17 is curved both in vertical cross section (FIG. 2) and in plan (FIG. 3) for optimum effect. The mirror 19, as illustrated, has a planar reflecting surface and does not have magnifying capabilities, although this mirror could also be a magnifying mirror having different magnifying properties than the mirror 17. Both mirrors are supported by the holder 21 within the enclosure 30 of the frame and, thus, have a width and height somewhat less than the opening of the forward side of the enclosure.

The mirrors 17 and 19 are carried within the holder 21 in back-to-back relationship, the holder rimming the two mirrors and holding them securely together. Studs 45 are mounted in elongated stud receptacles 47 at each end of the holder with the longitudinal axes of the studs disposed along the line of the longitudinal axes of the mirrors. The studs 45, which are spring-loaded to be forced outwardly, are received in frame detents 49 located in the end walls 41 of the enclosure 30 to releasably mount the holder within the enclosure. In this manner, the holder 21 and, hence, the mirrors 17 and 19 are free to rotate within the enclosure 30 but are removable therefrom by forcing the studs 45 inwardly of their receptacles 47. Preferably, the force exerted by the studs is sufficient to create a frictional force resisting, but not preventing, rotation of the holder relative to the frame.

The holder is held selectively in a vertical alignment relative to the enclosure 30 by projections 51 which are provided on the upper and lower edges of the holder and which frictionally engage detents 53 in the top wall 31 and the bottom wall 33 of the enclosure. The locking effect of these studs may be overcome by force applied against the holder or mirrors to rotate the holder and selectively interchange the magnifying reflecting mirror 17 with the non-magnifying mirror 19. It will be noted that the detents define a curved inwardly facing surface of some length. This permits some limited adjustment of the position of the holder relative to the frame while the holder is in an operative position. For example, the angle of the holder relative to the frame may vary 10° while the holder is being held by the detents. The device 11 is depicted in the drawings as having its magnifying mirror 17 disposed generally upright and facing forwardly of the enclosure 30 with its generally parallel upper and lower edges horizontal. The upper and lower flanking mirrors 37 and 39, respectively, are non-magnifying in a preferred embodiment and project forwardly from the upper and lower edges, respectively, of the holder 21 at an obtuse angle to the mirror 19 and are carried by the panels 43 which include peripheral retaining flanges 53. This angle in a preferred embodiment is 112°. However, the mirrors 37 and 39 could also be magnifying mirrors, if desired.

Attached to the frame 13 on each side of the enclosure 30, i.e., adjacent the end walls 41 thereof, are light sources 27 and each includes a reflector 55 which directs the light inwardly toward the opposite end of the enclosure. These light sources are electrically connected to an electrical switch 56 mounted on the bottom inclined section 39 of the back wall of the enclosure. In this manner, the viewer may be provided with the most beneficial lighting effect for viewing the eye.

The pedestal 29 includes a base 57 having a standard 59 extending upwardly therefrom. In the illustrated embodiment, the standard 59 is tubular and has one leg 60 of an L-shaped rod 61 inserted in its upper end. The remaining leg 62 of the rod 61 projects laterally of the standard.

The frame 13 is secured to the pedestal 29 by means of a clip 63 (FIG. 2) formed of a resilient metal to provide a partially open loop 65 and an arm 67 projecting from each side of the open portion of the loop. The loop 65 is proportioned to receive the leg 62 of the pedestal rod 61 and extends through a slot 69 provided in the central section 35 of the back wall of the enclosure 30 to a position exterior of the rear of the enclosure while the arms 67 remain within the enclosure and bear against the inner surface of the section 35. The arms 67 of the clip 63 are preferably formed so as to cause the loop 65 to be biased inwardly of the enclosure slightly. When the leg 62 of the pedestal rod 61 is inserted in the loop 65, the inward bias of the loop holds the clip 63, the rod 61 and the frame tightly together. However, the frame is capable of restricted rotational movement about the axis defined by the leg 62 and may thus be tilted for the most desirable viewing angle.

Referring to FIG. 4, there is shown a mounting means for the frame 13 which is an alternative to the pedestal 29. The means shown is in the form of a mounting bracket 71 having holes 73 for securing the bracket to a wall or the like. The bracket 71 is provided with an L-shaped outwardly projecting rod 75 adapted to be received into the loop 65 of the clip 63 in the manner of the leg 62 of the rod 61 just described.

The optical path for one viewing an image solely in either the magnifying mirror 17 or the non-magnifying mirror 19 is merely a direct line onto the mirror and back. If the viewer has his eye approximately four to eight inches from the surface of a mirror 17 or 19 and looks into the upper flanking mirror 23, the reflected image which is seen has passed from the lower flanking mirror 25 to a mirror 17 or 19, to the upper flanking mirror 23 and to the eye. Conversely, if one looks into the lower flanking mirror 25, the reflected image has traveled from the upper flanking mirror 23 to a central mirror 17 or 19, to the lower flanking mirror 25, and to the eye. Thus, one wishing to view the lower portion of the eye would look into the upper flanking mirror 23, while one wishing to view the upper portion of the eye would look into the lower flanking mirror 25. As every image seen by the eye is reflected by the central mirror, when the magnifying mirror 17 is positioned to face forwardly and the flanking mirrors 23 and 25 are non-magnifying, every image reflected to the viewer is magnified once. If the mirrors 23 and 25 are also magnifying mirrors, the images reflected to the eye will be magnified three times. In the latter case, the image may be distorted but such distortion can frequently be tolerated.

There is illustrated in FIG. 5 an alternate form of the device 13 in which the central mirrors 17 and 19 are not mounted for rotation but rather are mounted so as to permit them to be releasably locked in place on the frame in either of two positions, i.e., with either the magnifying mirror 17 of the non-magnifying mirror 19 facing outwardly intermediate flanking mirrors 23 and 25.

More specifically, a frame 77 is provided which includes a central portion or enclosure having a back wall 79 and end walls 81. The back wall 79 is provided with an opening 83 through which a finger of the user may be inserted to assist in detaching the mirrors 17 and 19 from the frame. The end walls terminate along a portion of their edges in tabs 85 which form angular projections 87 and which may be flexed outwardly to release the mirrors 17 and 19, as hereinafter described. The frame 77 also supports flanking mirrors such as the mirrors 23 and 25, although these mirrors are not shown in FIG. 5.

Carried by the frame 77 is a holder 89 which encircles the mirrors 17 and 19 and holds them securely together in back-to-back relation. The holder 89 includes end walls 91, each of which is provided with a detent 93 to receive the angular projection 87 of the adjacent tab 85. The inner engagement of the projections 87 and the detent 93 maintains the holder in the desired position within the frame 77. However, when the tabs 85 are flexed outwardly, the projections 87 are moved out of the detent to release the holder for removal from the frame. The user may insert his finger through the hole 83, if desired, to facilitate such removal. The holder may then be reversed and replaced so as to present the opposite mirror 17 or 19 outwardly. Alternatively, each of the mirrors 17 and 19 may be mounted on a separate holder 89, in which case they would be interchanged by removing one and substituting the other.

Thus, the invention provides a highly satisfactory device for examining the eyes. It provides a well-lighted image to the viewer from three differing angles of perspective, and this image may be magnified or not as the viewer chooses. Further, the device may be positioned at the proper viewing height either on a wall or pedestal and the device may be rotated about its mounting to provide the optimum viewing angle.

While one specific structural embodiment of the invention has been shown and described, it should be apparent that various modifications may be made without departing from the scope of this invention.

Various of the features of the invention are set forth in the following claims.

What is claimed is:

1. An image-reflecting device for use as a looking glass for the eyes, said device comprising, in combination, a frame, means mounted on said frame defining a first image-reflecting surface adapted to be disposed in a generally upright forwardly facing position, said first image-reflecting surface having a pair of generally parallel edges and being capable of magnifying an image reflected, means defining a flanking image-reflecting surface extending forwardly from adjacent each of said generally parallel edges respectively of said first image-reflecting surface and at an obtuse angle relative thereto such that when the device is placed in close proximity to the eye, a magnified image of the eye and portions of the head surrounding same is formed by each of said surfaces with each image presenting a different angle of perspective, means defining a second image-reflecting surface having different optical characteristics from said first image-reflecting surface mounted adjacent said first image-reflecting surface, and means for mounting said first and second image-reflecting surfaces on said frame so as to permit the positions of said first and second image-reflecting surfaces to be selectively interchanged relative to said flanking surfaces.

2. An image-reflecting device in accordance with claim 1, wherein said means defining said first image-reflecting surface is mounted for pivotal movement about an axis passing generally through its geometric center, and wherein said means defining said second image-reflecting surface is mounted back-to-back relative to said means defining said first image-reflecting surface.

3. An image-reflecting device for use as a looking glass for the eyes, said device comprising, in combination, a frame, means mounted on said frame defining a first image-reflecting surface adapted to be disposed in a generally upright forwardly facing position, said first image-reflecting surface having a pair of generally parallel edges and being capable of magnifying an image reflected, means defining a flanking image-reflecting surface extending forwardly from adjacent each of said generally parallel edges respectively of said first image-reflecting surface and at an obtuse angle relative thereto such that when the device is placed in close proximity to the eye, a magnified image of the eye and portions of the head surrounding same is formed by each of said surfaces with each image presenting a different angle of perspective, and bracket means to alternatively mount said frame on a wall or on an upright support.

4. A device in accordance with claim 1, wherein a light source is mounted on said frame adjacent one of the side edges of said first image-reflecting surface.

5. An image-reflecting device in accordance with claim 1 wherein said means defining said first and second image-reflecting surfaces are mounted in back-to-back relationship, and wherein means are provided for releasably mounting said means defining said first and second image-reflecting surfaces to said frame.

6. An image-reflecting device for use as a looking glass for the eyes, said device comprising, in combination, a frame, means mounted on said frame defining a first image-reflecting surface adapted to be disposed in a generally upright forwardly facing position, said first image-reflecting surface having a pair of generally parallel edges and being capable of magnifying an image reflected, means defining a flanking image-reflecting surface extending forwardly from adjacent each of said generally parallel edges respectively of said first image-reflecting surface and at an obtuse angle relative thereto such that when the device is placed in close proximity to the eye, a magnified image of the eye and portions of the head surrounding same is formed by each of said surfaces with each image presenting a different angle of perspective, said means defining a first image-reflecting surface being mounted on said frame for limited pivotal movement relative to said flanking image-reflecting surfaces.

7. An image-reflecting device for use as a looking glass for the eyes, said device comprising, in combination, a frame, means mounted on said frame defining a first image-reflecting surface adapted to be disposed in a generally upright forwardly facing position, said first image-reflecting surface having a pair of generally parallel edges and being capable of magnifying an image reflected, means defining a flanking image-reflecting surface extending forwardly from adjacent each of said generally parallel edges respectively of said first image-reflecting surface and at an obtuse angle relative thereto such that when the device is placed in close proximity to the eye, a magnified image of the eye and portions of the head surroudning same is formed by each of said surfaces with each image presenting a different angle of perspective, each of said flanking image-reflecting surfaces being capable of magnifying an image reflected.

* * * * *